United States Patent
Iwasaki et al.

(10) Patent No.: US 11,061,312 B2
(45) Date of Patent: Jul. 13, 2021

(54) PROJECTION APPARATUS AND PROJECTION METHOD

(71) Applicant: FUJIFILM Corporation, Tokyo (JP)

(72) Inventors: Tatsuro Iwasaki, Saitama (JP); Yasunobu Kishine, Saitama (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 16/807,172

(22) Filed: Mar. 3, 2020

(65) Prior Publication Data

US 2020/0201159 A1 Jun. 25, 2020

Related U.S. Application Data

(63) Continuation of application No. PCT/JP2018/030127, filed on Aug. 10, 2018.

(30) Foreign Application Priority Data

Sep. 29, 2017 (JP) .............................. JP2017-190538

(51) Int. Cl.
- G03B 21/14 (2006.01)
- G03B 21/20 (2006.01)
- H04N 9/31 (2006.01)

(52) U.S. Cl.
CPC ......... G03B 21/208 (2013.01); G03B 21/142 (2013.01); G03B 21/147 (2013.01); G03B 21/2046 (2013.01); H04N 9/3185 (2013.01)

(58) Field of Classification Search
CPC .. G03B 21/14; G03B 21/208; G03B 21/2046; G03B 21/142; G03B 21/147; H04N 9/31; H04N 9/3185

(Continued)

(56) References Cited

U.S. PATENT DOCUMENTS 10,078,257 B2 * 9/2018 Wu ..................... G03B 21/142
10,481,363 B2 11/2019 Fujino
(Continued)

FOREIGN PATENT DOCUMENTS

| EP | 2919060 | 9/2015 |
|----|---------|--------|
| JP | 2007316461 | 12/2007 |

(Continued)

OTHER PUBLICATIONS

"International Search Report (Form PCT/ISA/210) of PCT/JP2018/030127," dated Oct. 30, 2018, with English translation thereof, pp. 1-6.

(Continued)

*Primary Examiner* — William C. Dowling
(74) *Attorney, Agent, or Firm* — JCIPRNET

(57) ABSTRACT

Provided are a projection apparatus and a projection method capable of uniformly projecting a projection image, in which blurring is suppressed, onto a projection target having projected and recessed portions outside the focal depth of a projection lens by using the afterimage effect. The projection apparatus includes: a light source; a projection image generation unit; a projection lens that projects a projection image generated by the projection image generation unit onto a projection target having projected and recessed portions, where a defocus optical transfer function at a specific frequency has two or more local maximum values and a second largest local maximum value is equal to or greater than 0.5 times a first largest local maximum value; an oscillation mechanism that oscillates the projection lens in a direction of an optical axis T; and a control unit that controls an amplitude and a period of the oscillation mechanism.

20 Claims, 16 Drawing Sheets

(58) Field of Classification Search
USPC .......................................... 353/69, 70, 101
See application file for complete search history.

(56) References Cited

U.S. PATENT DOCUMENTS

| | | | |
|---|---|---|---|
| 2009/0244090 | A1 | 10/2009 | Zhang et al. |
| 2012/0242911 | A1 | 9/2012 | Znamenskiy |
| 2015/0288936 | A1 | 10/2015 | Jakubiak |

FOREIGN PATENT DOCUMENTS

| | | |
|---|---|---|
| JP | 2009524849 | 7/2009 |
| JP | 2013516827 | 5/2013 |
| JP | 2016080954 | 5/2016 |
| JP | 2016149618 | 8/2016 |
| WO | 2017134781 | 8/2017 |

OTHER PUBLICATIONS

"Written Opinion of the International Searching Authority (Form PCT/ISA/237) of PCT/JP2018/030127," dated Oct. 30, 2018, with English translation thereof, pp. 1-7.

\* cited by examiner

PROJECTION APPARATUS AND PROJECTION METHOD

CROSS-REFERENCE TO RELATED APPLICATIONS

This application is a Continuation of PCT International Application No. PCT/JP2018/030127 filed on Aug. 10, 2018, which claims priority under 35 U.S.C. § 119(a) to Japanese Patent Application No. 2017-190538 filed on Sep. 29, 2017. Each of the above application(s) is hereby expressly incorporated by reference, in its entirety, into the present application.

BACKGROUND OF THE INVENTION

1. Field of the Invention

The present invention relates to a projection apparatus and a projection method, and more particularly to a projection apparatus and a projection method capable of performing projection onto a projection target having projected and recessed portions.

2. Description of the Related Art

In recent years, expressions using projection mapping have become widespread as one of expression methods using video. The target (projection target) onto which an image is projected in the projection mapping is often an object having projected and recessed portions, and may be different from a conventional projector screen configured as a flat surface.

In a case where the projected and recessed portions of the projection target are largely out of the focal plane, the projected image projected onto the projected and recessed portions is projected onto the projected and recessed portions outside the depth of field, and is visually recognized in a blurred state. Here, the projected image refers to an image projected onto a projection target.

In order to suppress blurring of the projected image, a technique of increasing the depth of field by increasing the distance between the projection apparatus and the projection target has been adopted.

This technique is for suppressing blurring of a projected image within a focal depth determined by a permissible circle of confusion, a focal length, an F number (aperture value), and a projection distance. However, it is difficult to suppress blurring of the projected image in projection onto projected and recessed portions outside the focal depth.

Therefore, in the past, a technique of suppressing blurring even in a case of performing projection onto projected and recessed portions outside the focal depth has been proposed.

For example, JP2007-316461A describes a technique of causing a projection optical system composed of a projection lens and the like to perform projection by periodically changing a focal position through a focus mechanism in a case of performing projection onto a projection target having a depth that cannot be compensated at the focal depth of the projector. Specifically, in the technique described in JP2007-316461A (referred to as Related Art 1), first, imaging data of a three-dimensional object as a projection target is acquired, and projection target object information indicating the shape and mounting state (the position and the orientation of the mounted object) of the three-dimensional object is generated on the basis of the imaging data. In Related Art 1, three-dimensional image data of a three-dimensional model having substantially the same shape as a three-dimensional object is acquired from an external image supply device. In Related Art 1, the three-dimensional object is divided into small regions that can be complemented at the focal depth of the projection lens on the basis of the projection target object information and the three-dimensional image data, partial images corresponding to the small region are generated, and the partial images are sequentially and periodically projected onto the three-dimensional object. Thereby, Related Art 1 has an object to perform projection in a state where blurring of the entire image composed of the partial images is suppressed by the afterimage effect.

SUMMARY OF THE INVENTION

However, simply projecting by periodically changing a focal position of a normal projection lens may cause the projected image obtained by the afterimage effect to have no uniform resolution. That is, an image visually recognized by the afterimage effect is determined by a combination of information about the resolution of the lenses of the projection lens and information about the period in a case where the focal position of the projection lens moves periodically. Therefore, even in a case where the focal position of the normal projection lens is periodically changed, a projected image in which blurring is uniformly suppressed is not necessarily projected.

JP2007-316461A does not describe the resolution characteristics of the projection lens, and does not describe uniform suppression of blurring in an image visually recognized by the afterimage effect.

The present invention has been made in view of such circumstances, and an object thereof is to provide a projection apparatus and a projection method capable of projecting a projection image, in which blurring is uniformly suppressed by using the afterimage effect, onto a projection target having projected and recessed portions outside the focal depth of a projection lens.

In order to achieve the above object, according to one aspect of the present invention, there is provided a projection apparatus comprising: a light source; a projection image generation unit that modulates light of the light source and generates a projection image; a projection lens that projects the projection image generated by the projection image generation unit onto a projection target having projected and recessed portions, where a defocus optical transfer function at a specific frequency has two or more local maximum values and a second largest local maximum value is equal to or greater than 0.5 times a first largest local maximum value; an oscillation mechanism that oscillates the projection lens in a direction of an optical axis; and a control unit that controls an amplitude and a period of the oscillation mechanism. The projection lens projects the projection image on the basis of a synthetic defocus modulation transfer function obtained by the defocus optical transfer function at the specific frequency of the projection lens and a time during which the projection lens stays at coordinates at the amplitude. In addition, a focal depth of the synthetic defocus modulation transfer function is adjusted to a depth of the projected and recessed portions of the projection target.

According to the present aspect, in the projection lens, the defocus optical transfer function at the specific frequency has two or more local maximum values, and the second largest local maximum value is equal to or greater than 0.5 times the first largest local maximum value. According to the present aspect, the projection image is projected onto the projection target on the basis of the synthetic defocus modulation transfer function obtained by oscillating the projection lens at a predetermined period and a predetermined amplitude. Thereby, in the present aspect, the projection image, in which blurring is uniformly suppressed, can be projected onto the projection target having the projected and recessed portions.

It is preferable that a width of 0.35 or more of the synthetic defocus modulation transfer function is two or more times the amplitude.

According to the present aspect, the width of the synthetic defocus modulation transfer function having a value of 0.35 or more is two or more times the amplitude. Therefore, the projection image, in which blurring is uniformly suppressed, can be projected onto the projection target.

It is preferable that a width of 0.5 or more of the synthetic defocus modulation transfer function is two or more times the amplitude.

According to the present aspect, the width of the synthetic defocus modulation transfer function having a value of 0.5 or more is two or more times the amplitude. Therefore, the projection image, in which blurring is uniformly suppressed, can be projected onto the projection target.

It is preferable that a local minimum value between the first largest local maximum value and the second largest local maximum value has a value represented by the following expression. (Expression) local maximum value A×0.5 >local minimum value C >local maximum value A×(−0.5)

Here, the first largest local maximum value is the local maximum value A, and the local minimum value between the first largest local maximum value and the second largest local maximum value is the local minimum value C. According to the present aspect, since the local minimum value between the first largest local maximum value and the second largest local maximum value satisfies the relationship of the above expression, the projection image, in which blurring is uniformly suppressed, can be projected.

It is preferable that the specific frequency is in a range of ½ Nyquist frequency to ¼ Nyquist frequency.

According to the present aspect, since the specific frequency is in the range of ½ Nyquist frequency to ¼ Nyquist frequency, a projection image, in which blurring is uniformly suppressed, can be projected, and the projection image which is projected has a high resolution.

It is preferable that the control unit controls one period of 0.05 second to 0.1 second.

According to the present aspect, since the projection lens is oscillated in one period of 0.05 second to 0.1 second, the projection image, in which blurring is uniformly suppressed, can be projected by an appropriate afterimage effect.

It is preferable that in the projection lens, a size of a projected image of the projection image projected at a first focal position is equal to a size of a projected image of the projection image projected at a second focal position.

According to the present aspect, in the projection lens, the size of the projected image of the projection image projected at the first focal position is equal to the size of the projected image of the projection image projected at the second focal position. That is, in the projection lens of the present aspect, the size of the projected image does not change even in a case where the focal position is moved. Thereby, in the present aspect, a projection image, in which blurring is suppressed by the afterimage effect, can be projected.

It is preferable that the projection apparatus further comprises a distance measurement unit that measures a distance between the projection lens and the projection target. It is preferable that the control unit controls the oscillation mechanism on the basis of the distance measured by the distance measurement unit.

According to the present aspect, the distance between the projection lens and the projection target is measured by the distance measurement unit, and the oscillation mechanism is controlled by the control unit on the basis of the distance measured by the distance measurement unit. Therefore, the projection image, in which blurring is suppressed, can be projected.

It is preferable that the control unit determines the amplitude of the oscillation mechanism on the basis of the distance measured by the distance measurement unit.

According to the present aspect, since the amplitude of the oscillation mechanism is determined on the basis of the distance measured by the distance measurement unit, the projection image, in which blurring is suppressed, can be projected.

The distance measurement unit measures a distance between the projection lens and the recessed portion of the projection target and a distance between the projection lens and the projected portion. In addition, the control unit determines the amplitude of the oscillation mechanism on the basis of the distance between the projection lens and the recessed portion of the projection target and the distance between the projection lens and the projected portion.

According to the present aspect, the distance from the projection lens to the recessed portion and the projected portion of the projection target is measured, and the amplitude of the oscillation mechanism is determined on the basis of the measured distance. Therefore, the projection image, in which blurring is suppressed, can be projected.

It is preferable that the distance measurement unit includes a camera having a distance measurement function.

It is preferable that an imaging lens of the camera having the distance measurement function is the projection lens or is coaxial with the projection lens.

According to the present aspect, since the imaging lens of the camera having the distance measurement function is the projection lens or is coaxial with the projection lens, it is possible to more accurately measure the distance between the projection lens and the projection target. As a result, a more accurately focused projection image can be projected.

According to another aspect of the present invention, there is provided a projection method of a projection apparatus including a light source, a projection image generation unit that modulates light of the light source and generates a projection image, a projection lens that projects the projection image generated by the projection image generation unit onto a projection target having projected and recessed portions, where a defocus optical transfer function at a specific frequency has two or more local maximum values and a second largest local maximum value is equal to or greater than 0.5 times a first largest local maximum value, and an oscillation mechanism that oscillates the projection lens in a direction of an optical axis. The projection method comprises a step of controlling an amplitude and a period of the oscillation mechanism. The projection lens projects the projection image on the basis of a synthetic defocus modulation transfer function obtained by the defocus optical transfer function at the specific frequency of the projection lens and a time during which the projection lens stays at coordinates at the amplitude. In addition, a focal depth of the synthetic defocus modulation transfer function is adjusted to a depth of the projected and recessed portions of the projection target.

According to the present invention, in the projection lens, the defocus optical transfer function at the specific frequency has two or more local maximum values, and the second largest local maximum value is equal to or greater than 0.5 times the first largest local maximum value. Since the projection image is projected onto the projection target by the synthetic defocus modulation transfer function obtained by oscillating the projection lens at a predetermined period and a predetermined amplitude, the projection image, in which blurring is uniformly suppressed, can be projected onto a projection target having projected and recessed portions.

DESCRIPTION OF THE PREFERRED EMBODIMENTS

Hereinafter, preferred embodiments of a projection apparatus and a projection method according to the present invention will be described with reference to the accompanying drawings.

Figure 1:
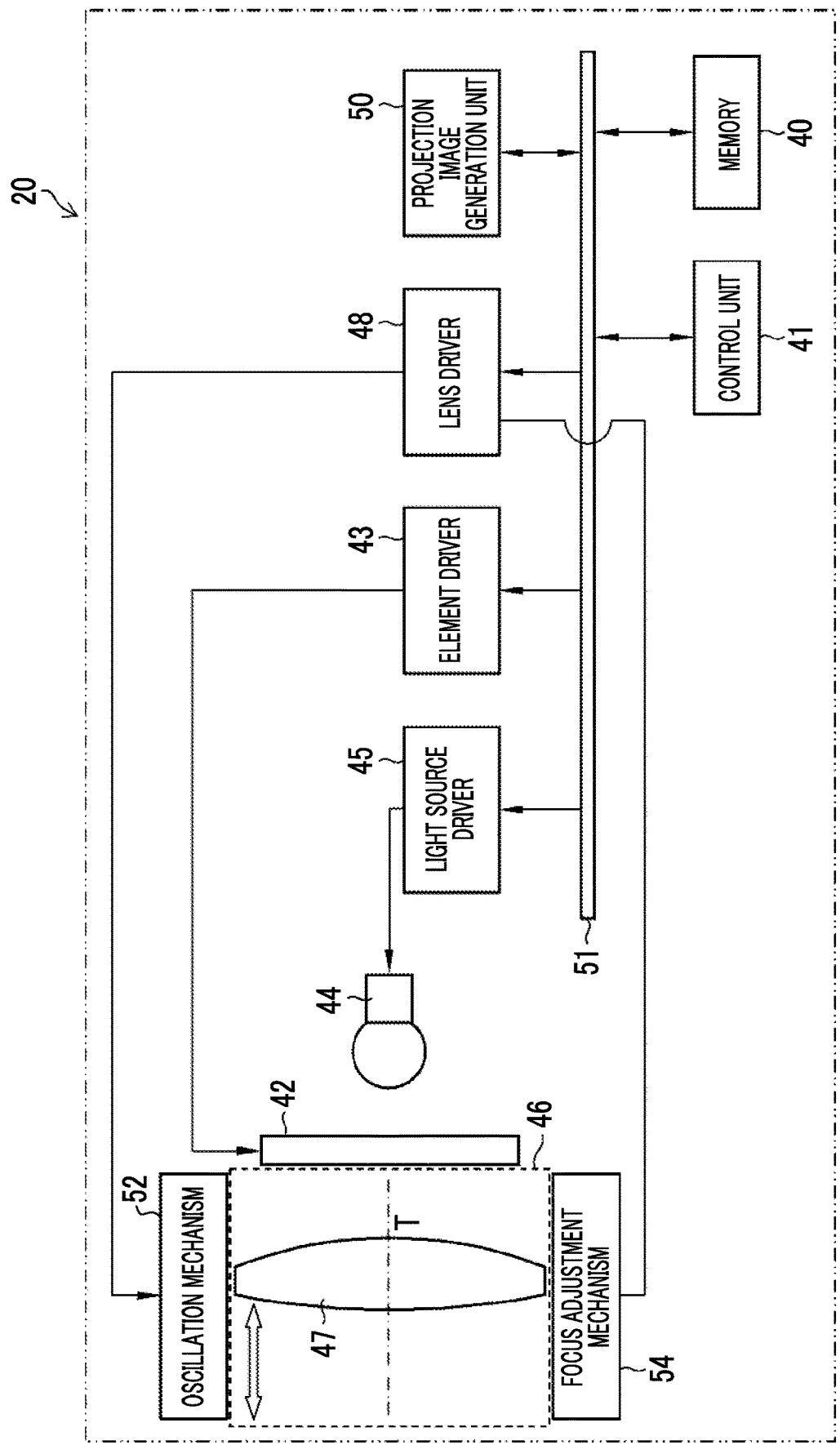
FIG. 1 is a block diagram showing a configuration of a projection apparatus.

FIG. 1 is a block diagram showing a configuration of a projection apparatus 20. The projection apparatus 20 is a single-panel type liquid crystal projector, and is composed of a projection lens 46, a lens driver 48, an oscillation mechanism 52, a focus adjustment mechanism 54, a display optical element (also referred to as a light modulation element) 42, an element driver 43, a light emitting diode (LED) light source 44, a light source driver 45, a projection image generation unit 50, a control unit 41, and a memory 40.

As the display optical element 42, a transmissive liquid crystal panel having a plurality of color filters or an element having a color filterless structure in which a dichroic mirror, a microlens array, and a monochrome transmissive liquid crystal panel are combined is used. An element having a color filterless structure, for example, separates white light into light of three colors of RGB by three types of dichroic mirrors that respectively reflect red (R) light, green (G) light, and blue (B) light, and causes light of three colors to be incident on the microlens array on the liquid crystal panel at different angles. Then, a color image can be displayed by causing the three colors of light to respectively be incident into the R, G, and B pixels of the liquid crystal panel through the microlens array.

The projection apparatus 20 is not limited to a single-panel type liquid crystal projector, but may be a known three-panel type liquid crystal projector including a color separation optical system and a plurality of liquid crystal panels. Further, the projection apparatus 20 is not limited to a transmissive liquid crystal system, and may employ various other systems such as a reflective liquid crystal display system and a reflective display system using a digital mirror device (DMD).

The element driver 43 controls the display optical element 42 under the control of the control unit 41 so as to display the projection image generated by the projection image generation unit 50.

The LED light source 44 corresponds to the projection light source of the present invention, and causes white light to be incident from the rear side of the display optical element 42 (the side opposite to the surface facing the projection lens 46) to the display optical element 42. Thereby, the image light of the projection image based on the projection image is emitted from the display optical element 42. The light source driver 45 controls the driving of the LED light source 44 under the control of the control unit 41. It should be noted that a light source other than the LED can be used as the projection light source of the present invention. In a case where a display optical element 42 such as a DMD or the like sequentially projecting R light, B light, and G light in a time-division manner is used, a light source sequentially irradiating the display optical element 42 with the R light, the B light, and the G light in a time-division manner is used as the projection light source. That is, light other than white light, such as R light, B light, and G light, can be used as the projection light of the present invention.

The projection lens 46 projects image light of a projection image, which is emitted from the display optical element 42, onto the projection target 10. Although the projection lens 46 is configured by combining a plurality of lenses, only a focus lens 47 that contributes to the focus of the projected image is shown, and other lenses are not shown. It should be noted that the projection lens 46 may be configured by a combination of a plurality of lenses, or may be composed of a single lens.

It is preferable that the projection lens 46 is designed such that the projected image does not change even in a case where the focus lens 47 is moved. That is, it is preferable that in the projection lens 46, a size of a projected image of the projection image projected at a first focal position is equal to a size of a projected image of the projection image projected at a second focal position. It should be noted that the specific design of the projection lens 46 that exhibits the characteristics of the present invention is designed by a known technique.

Under the control of the control unit 41, the lens driver 48 performs focus control and the like of the projection lens 46 through the focus adjustment mechanism 54. That is, in a case where the projection apparatus 20 has an autofocus function, the control unit 41 causes the lens driver 48 to move the focus lens 47 through the focus adjustment mechanism 54 by a known autofocus technique. In a case where the focus lens 47 is moved manually, the focus lens 47 is moved by the user operating the focus adjustment mechanism 54 through an operation unit (not shown).

The lens driver 48 oscillates the projection lens 46 through the oscillation mechanism 52 under the control of the control unit 41. The oscillation mechanism 52 oscillates the projection lens 46 in parallel with the direction of an optical axis T by a known technique. In order to oscillate the projection lens 46, it is preferable to oscillate only the focus lens 47. However, in a case where the projection lens 46 is composed of a single lens, the entire projection lens 46 may be oscillated. Further, the oscillation mechanism 52 may be provided integrally with the focus adjustment mechanism 54.

The control unit 41 is connected to the light source driver 45, the element driver 43, the lens driver 48, the projection image generation unit 50, and the memory 40 through the data bus 51. The control unit 41 is composed of various arithmetic units including a central processing unit (CPU), a processing unit, and a storage unit. The control unit 41 generally controls overall operation and processing of the projection apparatus 20 by executing a control program or data which is read from the memory 40.

Further, the control unit 41 controls the amplitude and the period of the oscillation mechanism 52. For example, the control unit 41 controls one period of the oscillation of the projection lens 46 from 0.05 second to 0.1 second, and preferably from 0.07 second to 0.09 second through the oscillation mechanism 52.

The memory 40 stores a control program for causing the control unit 41 to execute processing.

The projection image generation unit 50 modulates the light of the light source so as to generate a projection image. That is, under the control of the control unit 41, the projection image generation unit 50 generates a projection image on the basis of the data and information which is input from the control unit 41.

Figure 2:
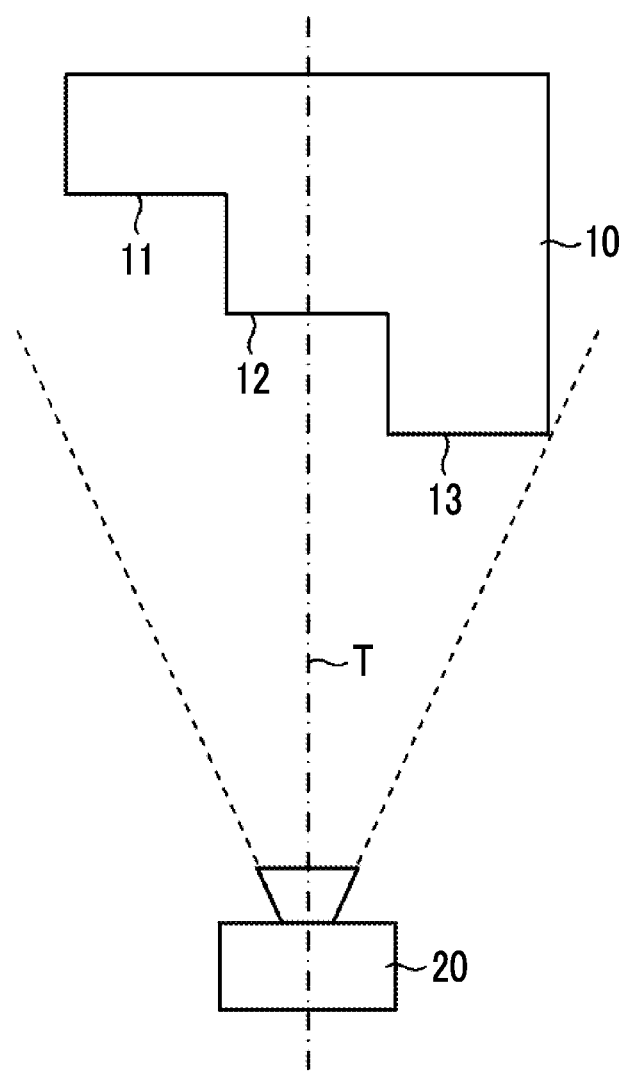
FIG. 2 is a diagram showing a projection apparatus and a projection target having projected and recessed portions.
Figure 3:
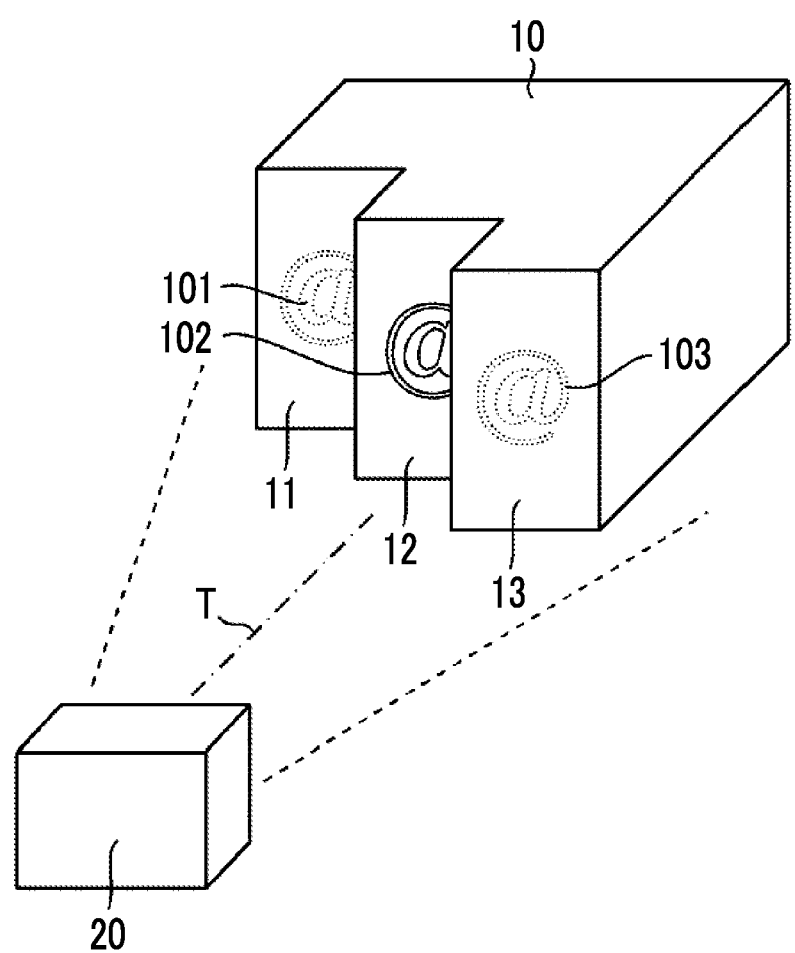
FIG. 3 is a diagram showing a projection apparatus and a projection target having projected and recessed portions.

FIGS. 2 and 3 are diagrams each showing the projection apparatus 20 and the projection target 10 having projected and recessed portions.

FIG. 2 is a plan view of the projection target 10 and the projection apparatus 20. There are provided a flat surface 11, a flat surface 12, and a flat surface 13, which are the flat surfaces onto which the projection images are projected by the projection apparatus 20, but the flat surfaces 11, 12, and 13 are not at the same distance from the projection apparatus 20. As described above, in a case where a projection surface of the projection target 10 is not composed of one flat surface, the projection target 10 has projected and recessed portions. It should be noted that the projection surface of the projection target 10 is not limited to a flat surface, and may be a curved surface or the like. In the case shown in the drawing, the optical axis T of the projection lens 46 is on the flat surface 12.

FIG. 3 is a perspective view of the projection target 10 and the projection apparatus 20. The projection apparatus 20 projects a projection image onto the projection target 10 having projected and recessed portions composed of the flat surface 11, the flat surface 12, and the flat surface 13. A projected image 101, a projected image 102, and a projected image 103 respectively projected on the flat surface 11, the flat surface 12, and the flat surface 13 are shown. In the case shown in FIG. 3, since the focal plane is set on the flat surface 12, the flat surfaces 11 and 13 are out of the focal depth. The projected image 101 projected onto the flat surface 11 and the projected image 103 projected onto the flat surface 13 are out of the focal depth, and are thus blurred images.

Figure 4A:
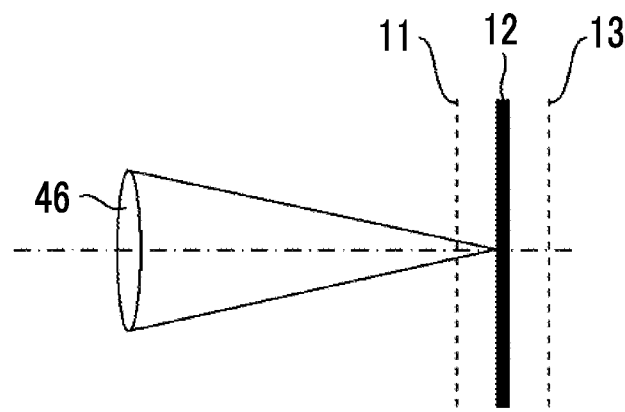
FIGS. 4A and 4B are diagrams showing projected images.
Figure 4B:
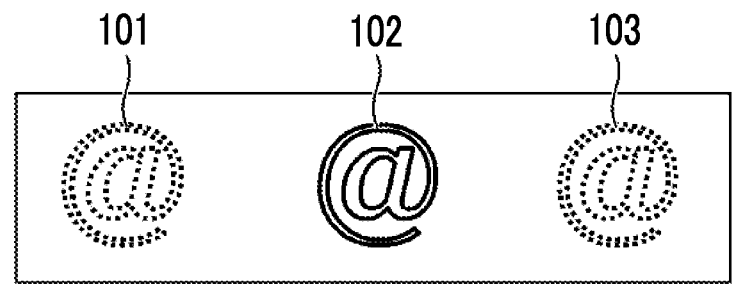

FIGS. 4A and 4B are diagrams showing projected images in a case where the focal plane is on the flat surface 12 shown in FIGS. 2 and 3. FIG. 4A is a diagram for explaining the projection lens 46 and the focal plane, and FIG. 4B shows projected images on the flat surface 11, the flat surface 12, and the flat surface 13 in the case of the focal plane shown in FIG. 4A. The projected image 102 on the flat surface 12 is a clear image without blurring since the focal plane is on the flat surface 12. On the other hand, the projected images 101 and 103 on the flat surfaces 11 and 13 are blurred images since the flat surfaces 11 and 13 are out of the focal depth of the projection lens 46. It should be noted that although the projection lens 46 is composed of a plurality of lenses as described with reference to FIG. 1, the projection lens 46 is simply described as a single lens. In FIGS. 4A to 6B, the blurred projected image is indicated by the dotted line, and the focused projected image is indicated by the solid line.

Figure 5A:
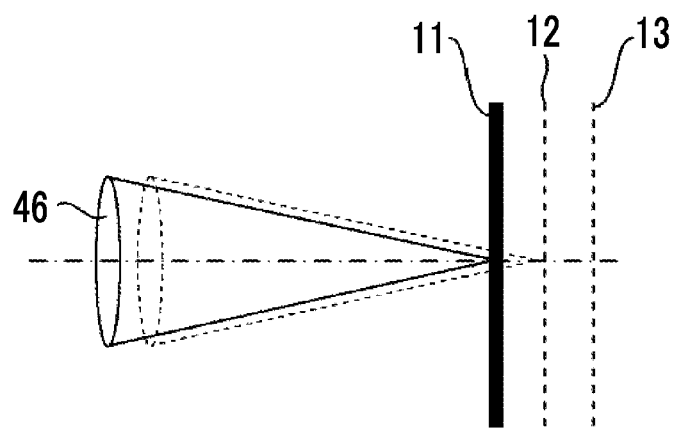
FIGS. 5A and 5B are diagrams showing projected images.
Figure 5B:
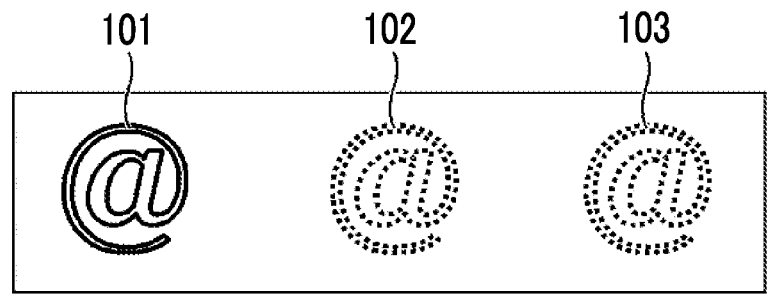

FIGS. 5A and 5B are diagrams showing projected images in a case where the focal plane is on the flat surface 11. It should be noted that the description of the parts already described in FIGS. 4A and 4B will be omitted. The projected image 101 projected onto the flat surface 11 is an image that is not blurred since the focal plane is on the flat surface 11. On the other hand, the projected images 102 and 103 projected onto the flat surfaces 12 and 13 are blurred images since the flat surfaces 12 and 13 are out of the focal depth of the projection lens 46.

Figure 6A:
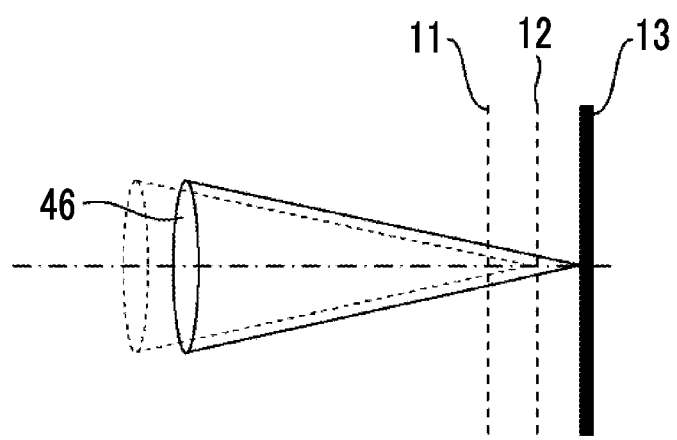
FIGS. 6A and 6B are diagrams showing projected images.
Figure 6B:
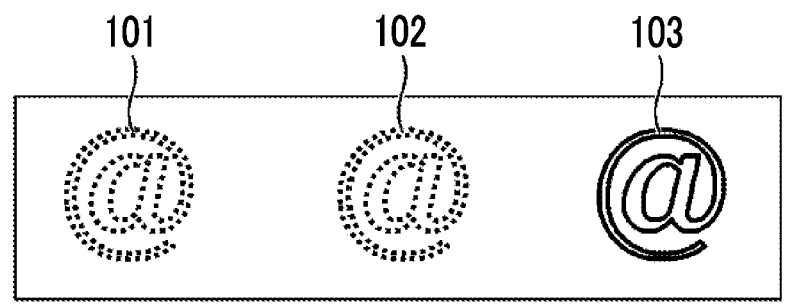

FIGS. 6A and 6B are diagrams showing projected images in a case where the focal plane is on the flat surface 13. It should be noted that the description of the parts already described in FIGS. 4A and 4B will be omitted. The projected image 103 projected onto the flat surface 13 is an image that is not blurred since the focal plane is on the flat surface 13. On the other hand, the projected images 101 and 102 projected onto the flat surfaces 11 and 12 are blurred images since the flat surfaces 11 and 12 are out of the focal depth of the projection lens 46.

Figure 7A:
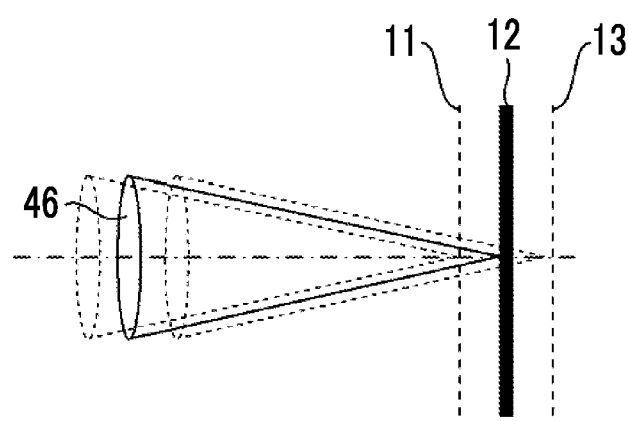
FIGS. 7A and 7B are diagrams showing projected images.
Figure 7B:
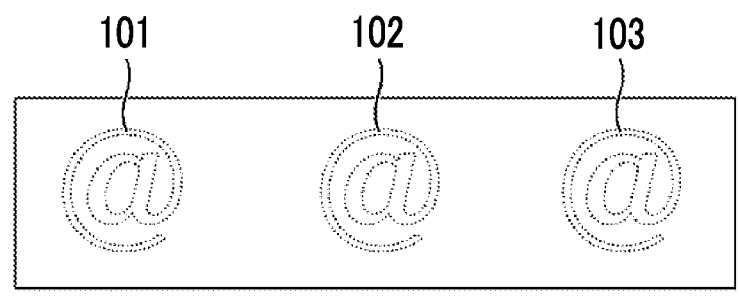

FIGS. 7A and 7B are diagrams showing projected images in a case where the projection lens 46 is oscillating. The projection lens 46 is oscillated by the control unit 41 through the oscillation mechanism 52. Specifically, the projection lens 46 oscillates and reciprocates the position of the focal plane between the flat surface 11, the flat surface 12, and the flat surface 13. Thereby, the projected images 101, 102, and 103, which are images projected onto the flat surface 11, the flat surface 12, and the flat surface 13, are images in which blurring is suppressed by the afterimage effect. In a case where it is desired to further suppress blurring, an image in which edges are overemphasized may be projected.

It is necessary for the oscillation of the projection lens 46 to have a speed enough to cause the afterimage effect, but the speed is not particularly limited. For example, the control unit 41 causes the oscillation mechanism 52 to oscillate the projection lens 46 such that the projection lens 46 oscillates in one period of 0.05 second to 0.1 second.

The amplitude of the oscillation of the projection lens 46 may be determined in accordance with the projected and recessed portions of the projection target 10. For example, the maximum value of the amplitude is obtained in a case where the projection lens 46 may be oscillated to be adjusted to the focal plane closest to the projection lens 46, and the minimum value of the amplitude may be obtained in a case where the projection lens 46 is oscillated to be adjusted to the focal plane farthest from the projection lens 46. In FIGS. 7A and 7B, an image visually recognized as blurring is suppressed by the afterimage effect is indicated by the dotted line.

<Defocus Optical Transfer Function of Projection Lens>

Next, a defocus optical transfer function (OTF) indicating characteristics of the projection lens 46 included in the projection apparatus 20 will be described.

The projection lens 46 has specific defocus OTF characteristics. Thereby, the projected image, which is visually recognized by the afterimage effect by oscillating the projection lens 46, can be projected as an image in which blurring is uniformly suppressed.

Specifically, the defocus OTF of the projection lens 46 at a specific frequency has at least two or more local maximum values. Further, the second largest local maximum value B of the defocus OTF at the specific frequency of the projection lens 46 is equal to or greater than 0.5 times the first largest local maximum value A. Since the defocus OTF at the specific frequency has such characteristics, in a case where the projection lens 46 is oscillated, it is possible to realize projection of an image in which blurring is uniformly suppressed.

In addition, it is preferable that the specific frequency is in the range of, for example, ½ Nyquist frequency to ¼ Nyquist frequency. Since the defocus OTF of the projection lens 46 has the above-mentioned characteristics in the range from the ½ Nyquist frequency to the ¼ Nyquist frequency, it is possible to project an image in which blurring is uniformly suppressed at a high resolution.

In the defocus OTF of the projection lens 46, it is preferable that the value of the local minimum value C between the first largest local maximum value A and the second largest local maximum value B satisfies the following expression. Since the defocus OTF of the projection lens 46 has a characteristic satisfying the following relational expression, it is possible to project an image in which blurring is uniformly suppressed.

(Expression) local maximum value A×0.5 >local minimum value C >local maximum value A×(−0.5)

Figure 8A:
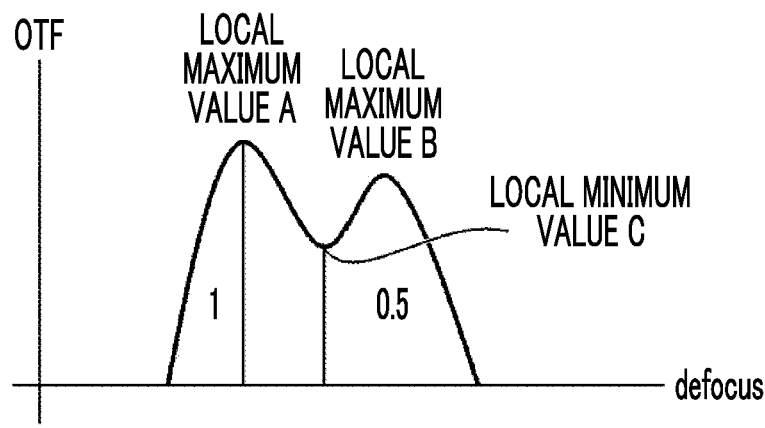
FIGS. 8A and 8B are diagrams conceptually showing characteristics of a defocus optical transfer function of the projection lens.
Figure 8B:
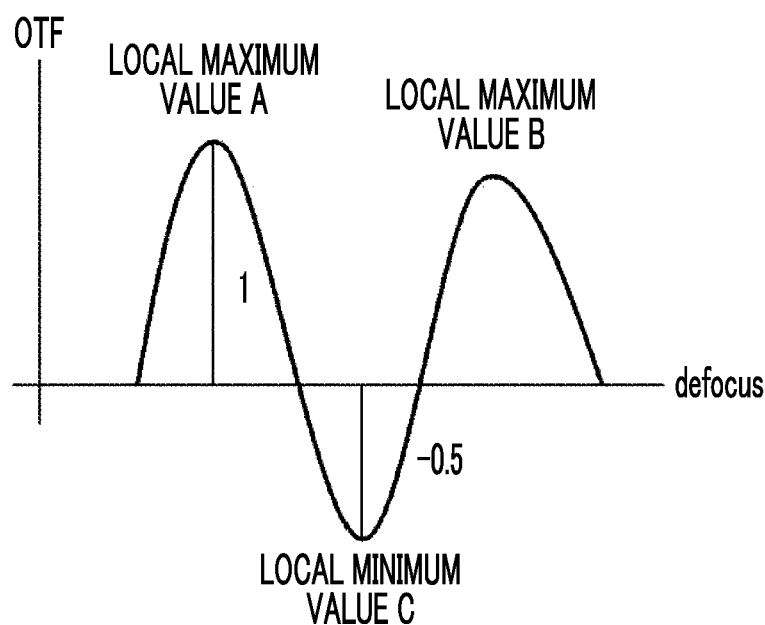

FIGS. 8A and 8B are diagrams conceptually showing a case where the characteristic of the defocus OTF of the projection lens 46 satisfies the above relational expression of (Expression). FIG. 8A shows an example of the defocus OTF of the projection lens 46 in a case where the first largest local maximum value A×0.5=the local minimum value C. FIG. 8B shows an example of the defocus OTF of the projection lens 46 in a case where the first largest local maximum value A×(−0.5)=the local minimum value C. In a case where the characteristic of the defocus OTF of the projection lens 46 satisfies the above relational expression (Expression), the projection lens 46 may be oscillated. In this case, it is possible to obtain a projection image in which blurring is uniformly suppressed.

<Synthetic Defocus Modulation Transfer Function>

Next, the synthetic defocus modulation transfer function (MTF) will be described. The projection lens 46 projects the projection image onto the projection target 10 on the basis of the synthetic defocus MTF. The synthetic defocus MTF is obtained from the defocus OTF at the specific frequency of the projection lens 46 and the time the projection lens 46 stays at coordinates in amplitude. The focal depth of the synthetic defocus MTF is adjusted to the depth of the projected and recessed portions of the projection target 10.

Here, in a case of controlling the synthetic defocus MTF, there are methods of (1) optimization of the defocus MTF or OTF of the projection lens 46, (2) optimization of the oscillation speed (period) of the projection lens 46, and (3) optimization of edge processing for each position of the projection lens 46.

However, in the method (2), it is necessary to add a complicated mechanism such as an additional function of speed detection to the projection apparatus 20 in order to accurately reciprocate the projection lens 46. Therefore, the size and cost of the projection apparatus 20 are increased. In the method (3), it is necessary to perform edge processing at high speed while changing the strength of edge processing for each frame. Therefore, a signal processing cost is required. Therefore, the synthetic defocus MTF is controlled by the method (1) described above. Hereinafter, calculation of the synthetic defocus MTF will be described.

First, the defocus OTF of the projection lens 46 is calculated. Next, the time, during which the projection lens 46 stays at each coordinate in a case where the projection lens 46 is oscillated, is calculated. Thereafter, convolution of the defocus OTF of the projection lens 46 and the time, during which the lens stays at each coordinate, is performed. Then, an absolute value of the synthetic defocus OTF obtained by the convolution is obtained, and thereby the synthetic defocus MTF is obtained.

Figure 9A:
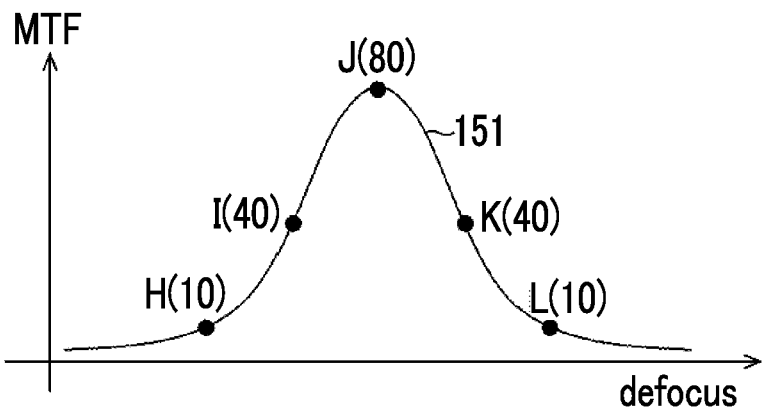
FIGS. 9A to 9C are diagrams each showing a synthetic defocus modulation transfer function.
Figure 9B:
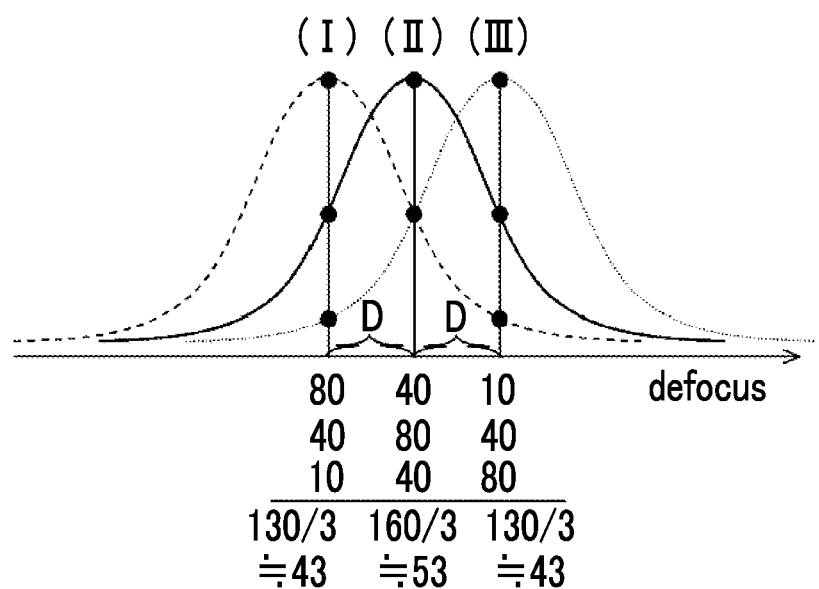
Figure 9C:
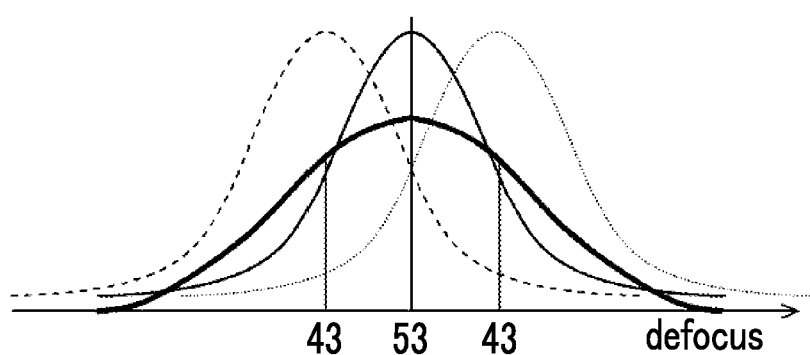

FIGS. 9A to 9C are diagrams each showing the synthetic defocus MTF.

FIG. 9A is a diagram showing the defocus MTF of the projection lens 46. The shown defocus MTF 151 does not have two local maximum values, but has one local maximum value (point J(80)). The defocus MTF 151 has a point H(10), a point I(40), a point J(80), a point K(40), and a point L(10).

FIG. 9B is a diagram showing the synthesis of the MTF in the three states in a case where the normal projection lens B having the defocus MTF 151 is oscillated. In the case where the projection lens B having the synthetic defocus is oscillated by the amplitude D and the defocus MTFs in the three states of +D, ±0, and −D are synthesized, the calculation is as follows.

In the state (I) (+D), the defocus MTFs are 80, 40, and 10, and the synthetic defocus MTF is 130/3, which is approximately equal to 43. In the state (II) (±0), the defocus MTFs are 40, 80, and 40, and the synthetic defocus MTF is 160/3, which is approximately equal to 53. In the state (III) (−D), the defocus MTFs are 10, 40, and 80, and the synthetic defocus MTF is 130/3, which is approximately equal to 43.

FIG. 9C is a diagram showing a graph of the synthetic defocus MTF. In FIG. 9B, the synthetic defocus MTFs are calculated for the three states. FIG. 9C shows the result of continuously calculating the synthetic defocus MTF in a case where the projection lens B is oscillated with the amplitude D. In addition, since the projection lens B is a normal projection lens that does not have the characteristics of the projection lens 46 of the present invention, blurring of the synthetic defocus MTF shown in FIG. 9C is not uniformly suppressed.

<Projection Lens>

Next, characteristics of the projection lens A1 as specific examples of the projection lens 46 will be described.

FIGS. 10A to 10E are diagrams showing characteristics of the projection lens A1 as specific examples of the projection lens 46. In a case where the projection image is projected onto the projection target on the basis of the synthetic defocus MTF obtained by oscillating the projection lens A1, the projection image in which blurring is uniformly suppressed can be projected.

Figure 10A:
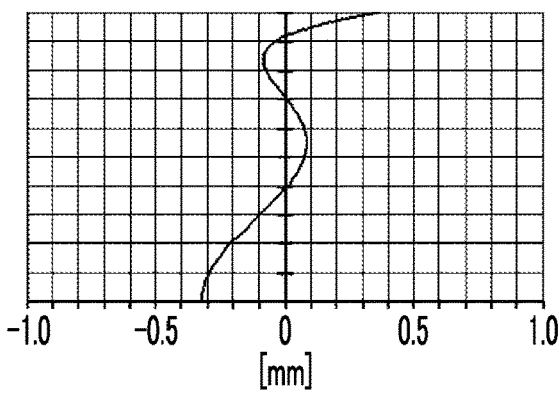
FIGS. 10A to 10E are diagrams showing characteristics of a projection lens.
Figure 10B:
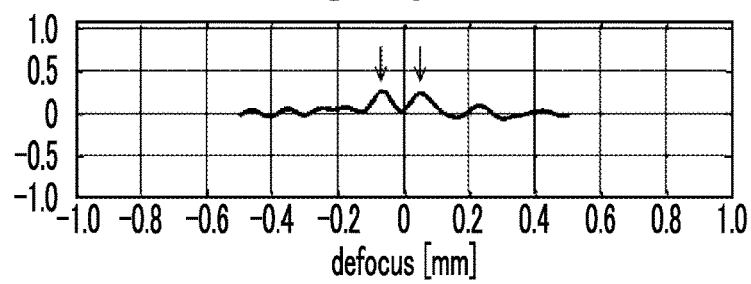

FIG. 10A shows the vertical spherical aberration of the projection lens A1. FIG. 10B shows the defocus OTF of the projection lens A1. The defocus OTF of the projection lens A1 has two or more local maximum values. Further, the second largest local maximum value is equal to or greater than 0.5 times the first largest local maximum value (refer to the arrow in the drawing).

Figure 10C:
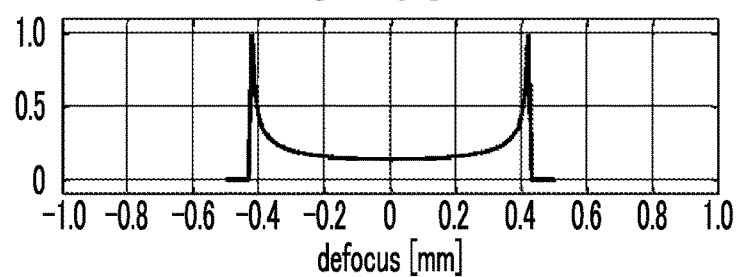
Figure 10D:
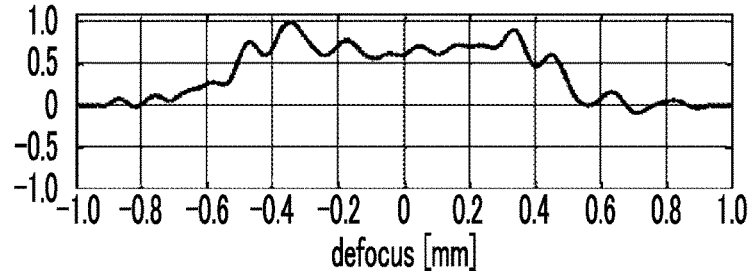
Figure 10E:
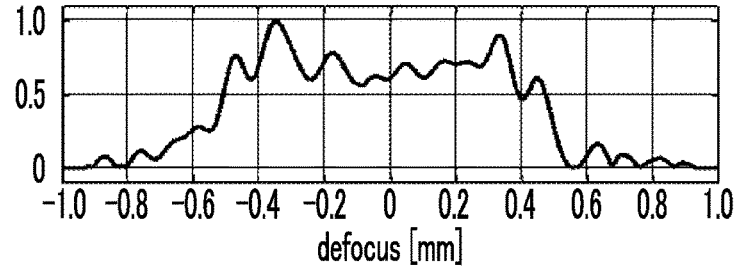

FIG. 10C shows the stay time in a case where the projection lens A1 is oscillated, and FIG. 10D shows the synthetic defocus OTF in a case where the projection lens A1 is oscillated during the stay time in FIG. 10C. The synthetic defocus OTF is calculated by convolution of the defocus OTF shown in FIG. 10B and the stay time shown in FIG. 10C. FIG. 10E shows the synthetic defocus MTF of the projection lens A1. The width of the synthetic defocus MTF of 0.35 or more is two or more times the amplitude (0.4 mm), and the width of the synthetic defocus MTF of 0.5 or more is two or more times the amplitude (0.4 mm).

<Example of First Distance Measurement>

Next, the projection method of the present invention in a case where the amplitude of the oscillation of the projection lens 46 is manually acquired will be described.

Figure 11:
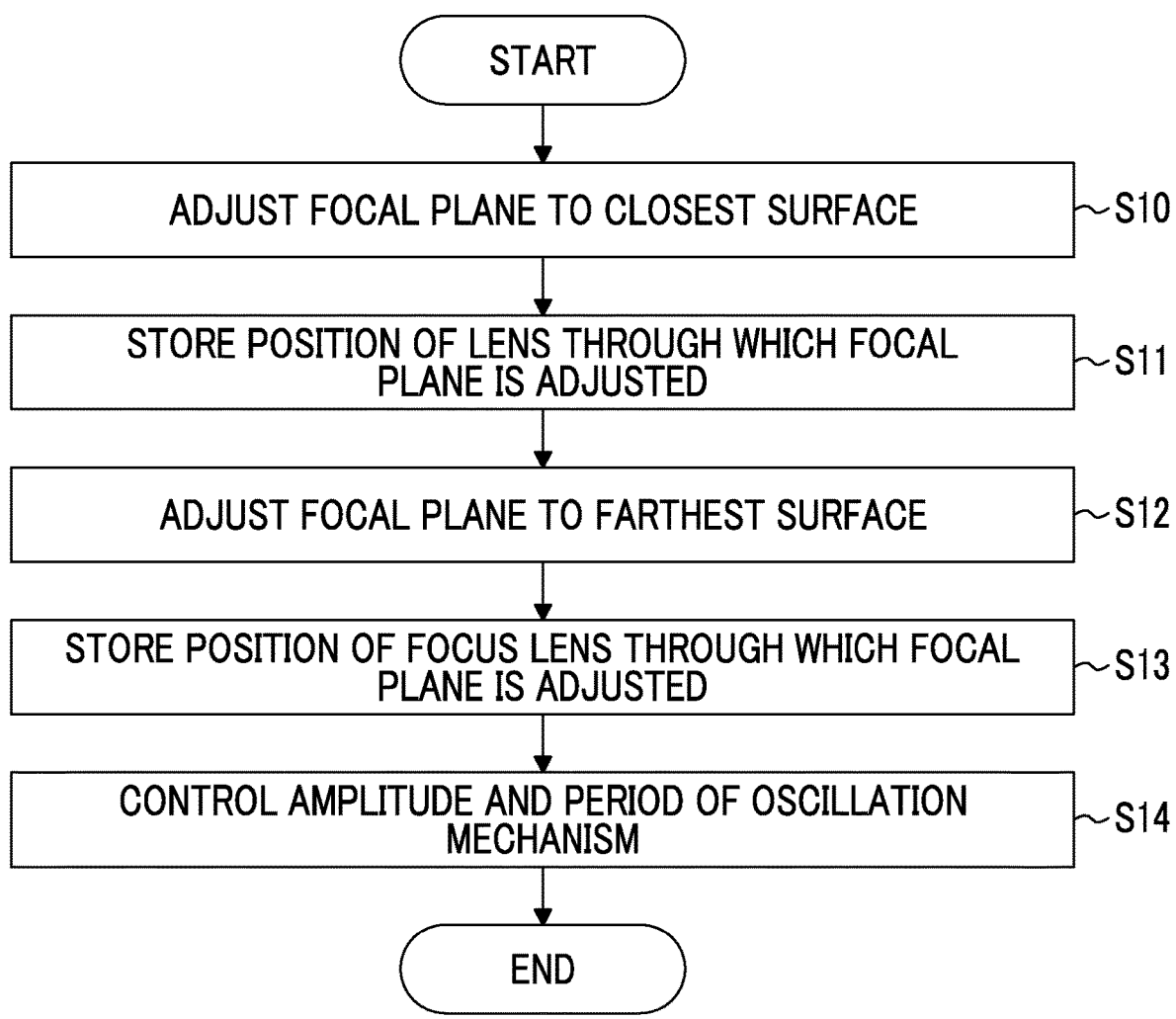
FIG. 11 is a diagram showing an operation flow of the projection apparatus.

FIG. 11 is a diagram showing an operation flow in the case where the distance to the projection target 10 is manually acquired and projected using the projection apparatus 20.

First, a user moves the focus lens 47 of the projection lens 46 using the focus adjustment mechanism 54 such that the focal plane of the projection lens 46 is adjusted to the surface (projected portion) closest to the projection lens 46 in the projection target 10 (step S10). Thereafter, the position of the focus lens 47 is stored as a first position in the memory 40 (step S11). Next, the user moves the focus lens 47 of the projection lens 46 using the focus adjustment mechanism 54 such that the focal plane of the projection lens 46 is adjusted to the surface (recessed portion) farthest from the projection lens 46 in the projection target 10 (step S12). Then, the position of the focus lens 47 is stored as the second position in the memory 40 (step S13). Thereafter, the control unit 41 controls the amplitude and the period of the oscillation mechanism 52 on the basis of the first position and the second position stored in the memory 40 (step S14). For example, the control unit 41 causes the oscillation mechanism 52 to oscillate the projection lens 46 between the first position and the second position.

In the above-mentioned embodiment, the hardware structure of the processing unit that executes various types of processing is various processors as described below. Various processors include: a central processing unit (CPU) as a general-purpose processor that executes software (programs) and functions as various processing units; a programmable logic device (PLD) as a processor that is capable of changing the circuit configuration after manufacture of a field programmable gate array (FPGA) and the like; and a dedicated electric circuit as a processor that has a circuit configuration specifically designed to execute specific processing of an application specific integrated circuit (ASIC) and the like.

One processing unit may be composed of one of these various processors, or composed of two or more processors of the same type or different types (for example, a plurality of FPGAs or a combination of a CPU and an FPGA). Further, a plurality of processing units may be composed of one processor. As an example in which a plurality of processing units are composed of one processor, there is a following configuration. First, one processor is configured as a combination of one or more CPUs and software as typified by computers such as clients and servers, and this processor functions as a plurality of processing units. Second, as typified by a system on chip (SoC) or the like, there is a configuration using a processor in which the function of the whole system including the plurality of processing units is implemented by one integrated circuit (IC) chip. In such a manner, the various processing units are configured using one or more of the above-mentioned various processors as a hardware structure.

Further, the hardware structure of these various processors is more specifically an electric circuit (circuitry) in which circuit elements such as semiconductor elements are combined.

The above-mentioned configurations and functions are appropriately implemented by any hardware, software, or a combination of both thereof. For example, the present invention can also be applied to a program which causes a computer to execute the above-mentioned processing step (processing order), a computer-readable recording medium (non-transitory recording medium) in which such a program is recorded, or a computer in which such a program can be installed.

<Examples of Other Projection Lenses>

Next, other examples of the projection lens 46 of the present invention will be described.

FIGS. 12A to 12E are diagrams showing characteristics of the projection lens A2 as specific examples of the projection lens 46.

Figure 12A:
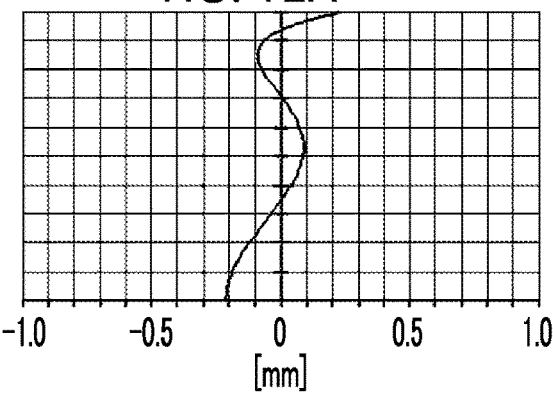
FIGS. 12A to 12E are diagrams showing characteristics of a projection lens.
Figure 12B:
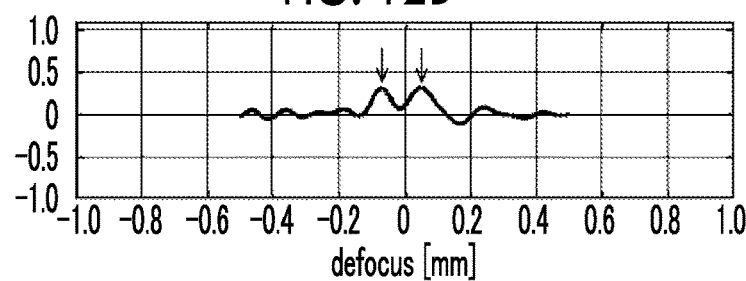

FIG. 12A shows the vertical spherical aberration of the projection lens A2. FIG. 12B shows the defocus OTF of the projection lens A2. The defocus OTF of the projection lens A2 has two or more local maximum values. Further, the second largest local maximum value is equal to or greater than 0.5 times the first largest local maximum value (refer to the arrow in the drawing).

Figure 12C:
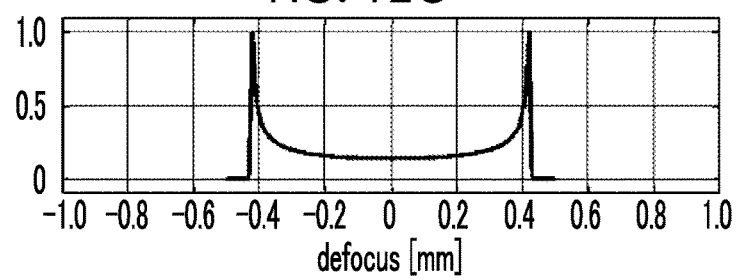
Figure 12D:
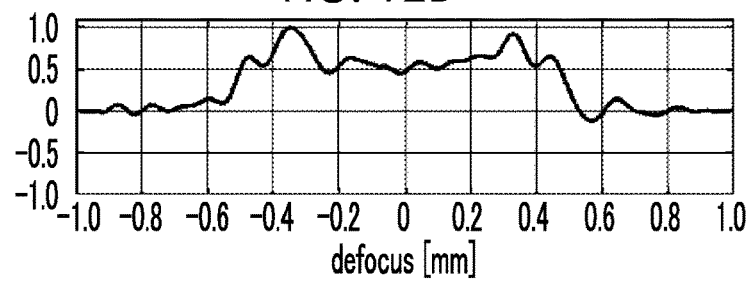
Figure 12E:
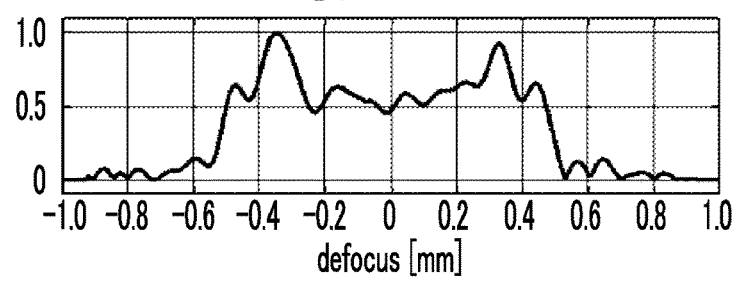

FIG. 12C shows the stay time in a case where the projection lens A2 is oscillated, and FIG. 12D shows the synthetic defocus OTF. FIG. 12E shows the synthetic defocus MTF of the projection lens A1. The width of the synthetic defocus MTF of 0.35 or more is two or more times the amplitude (0.4 mm), and the width of the synthetic defocus MTF of 0.5 or more is two or more times the amplitude (0.4 mm).

FIGS. 13A to 13E are diagrams showing characteristics of the projection lens A3 as specific examples of the projection lens 46.

Figure 13A:
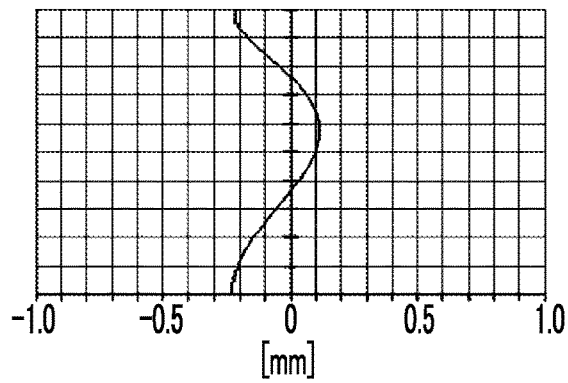
FIGS. 13A to 13E are diagrams showing characteristics of a projection lens.
Figure 13B:
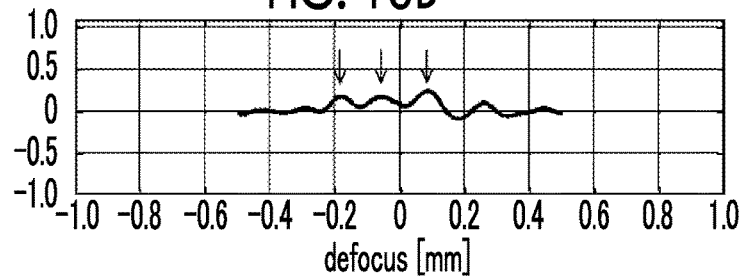

FIG. 13A shows the vertical spherical aberration of the projection lens A3. FIG. 13B shows the defocus OTF of the projection lens A3. The defocus OTF of the projection lens A3 has two or more local maximum values. Further, the second largest local maximum value is equal to or greater than 0.5 times the first largest local maximum value (refer to the arrow in the drawing).

Figure 13C:
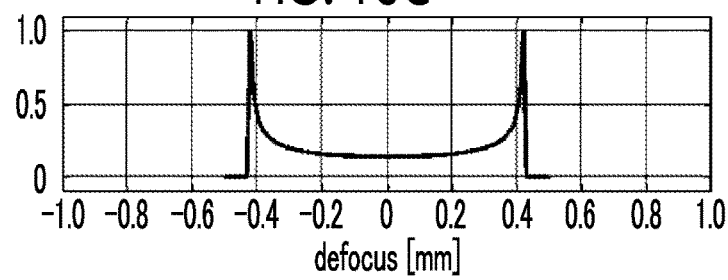
Figure 13D:
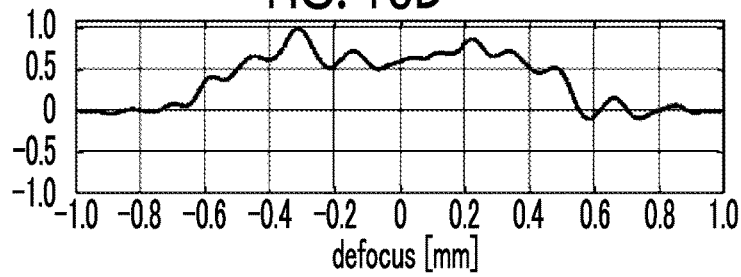
Figure 13E:
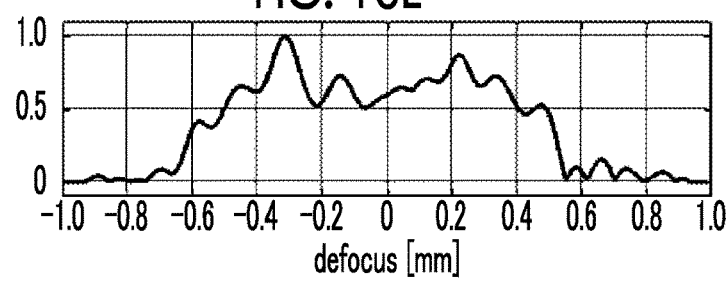

FIG. 13C shows the stay time in a case where the projection lens A3 is oscillated, and FIG. 13D shows the synthetic defocus OTF. FIG. 13E shows a synthetic defocus MTF of the projection lens A3. The width of the synthetic defocus MTF of 0.35 or more is two or more times the amplitude (0.4 mm), and the width of the synthetic defocus MTF of 0.5 or more is two or more times the amplitude (0.4 mm).

<Comparative Examples>

Next, a projection lens that is not suitable for the projection lens 46 of the present invention will be described.

FIGS. 14A to 14E are diagrams showing characteristics of the projection lens B1 as comparative examples. Even in a case where the projection image is projected onto the projection target through the synthetic defocus MTF obtained by oscillating the projection lens B1, the projection image in which blurring is uniformly suppressed cannot be projected.

Figure 14A:
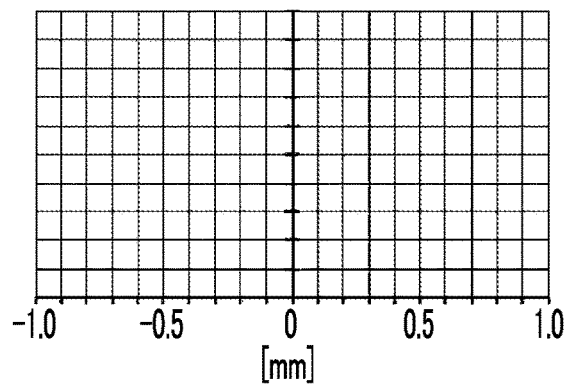
FIGS. 14A to 14E are diagrams showing characteristics of a projection lens of a comparative example.

FIG. 14A shows the vertical spherical aberration of the projection lens B1. The value of the spherical aberration is better as compared with the above-mentioned projection lenses A1 to A3. However, in a case where blurring is suppressed through the afterimage effect by oscillating the projection lens B1, blurring is not uniformly suppressed.

Figure 14B:
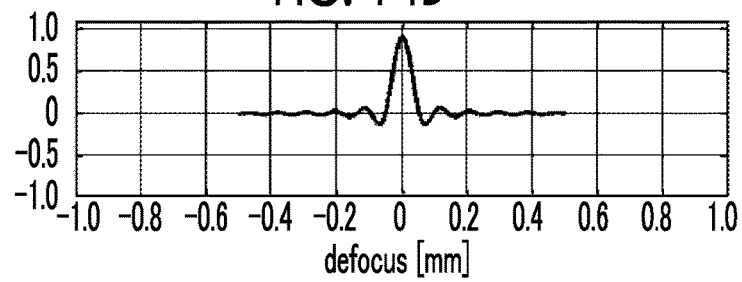

FIG. 14B shows the defocus OTF of the projection lens B1. The defocus OTF of the projection lens B1 has two or more local maximum values. However, the second largest local maximum value is less than 0.5 times the first largest local maximum value.

Figure 14C:
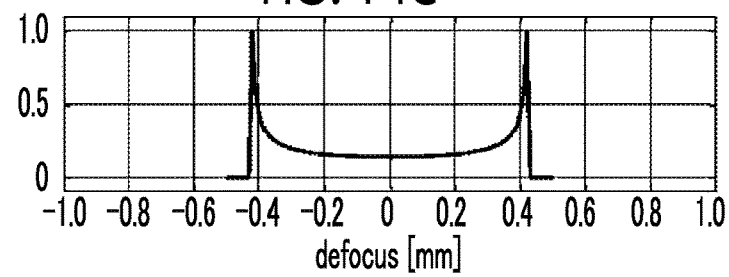
Figure 14D:
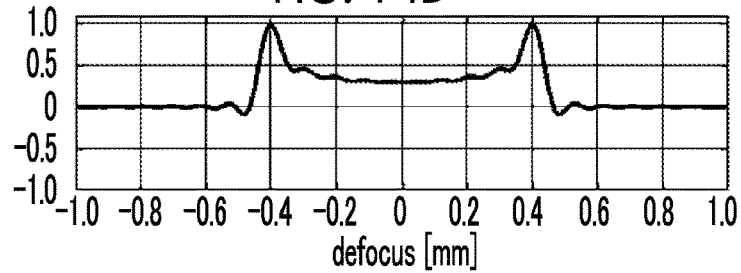
Figure 14E:
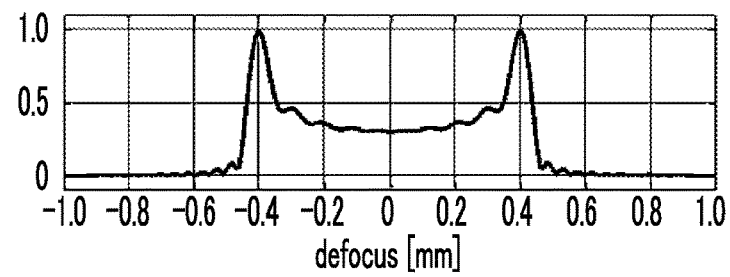

FIG. 14C shows the stay time in a case where the projection lens B1 is oscillated, and FIG. 14D shows the synthetic defocus OTF in a case where the projection lens B1 is oscillated during the stay time in FIG. 14C. The synthetic defocus OTF is calculated by convolution of the defocus OTF shown in FIG. 14B and the stay time shown in FIG. 14C. FIG. 14E shows the synthetic defocus MTF of the projection lens B1. The synthetic defocus MTF is rapidly improved around the defocus of 0.4 and −0.4. Therefore, even in a case where the projection image is projected on the basis of the above-mentioned synthetic defocus MTF, a projected image in which blurring is uniformly suppressed cannot be obtained.

FIGS. 15A to 15E are diagrams showing characteristics of the projection lens B2 as comparative examples. By projecting the projection image onto the projection target through the synthetic defocus MTF obtained by oscillating the projection lens B2, it is possible to project the projection image in which blurring is uniformly suppressed.

Figure 15A:
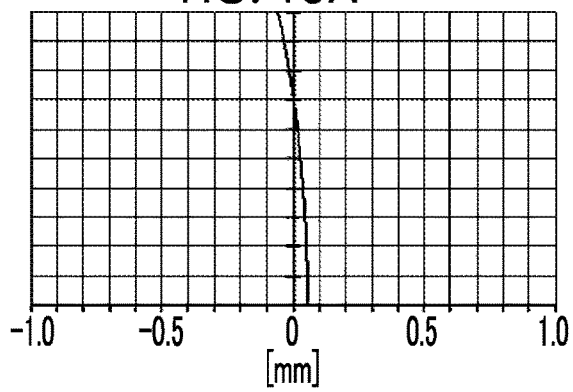
FIGS. 15A to 15E are diagrams showing characteristics of a projection lens of a comparative example.

FIG. 15A shows the vertical spherical aberration of the projection lens B2. The value of the spherical aberration is better as compared with the projection lenses B2 to A3 described above. However, in a case where blurring is suppressed through the afterimage effect by oscillating the projection lens B2, blurring is not uniformly suppressed.

Figure 15B:
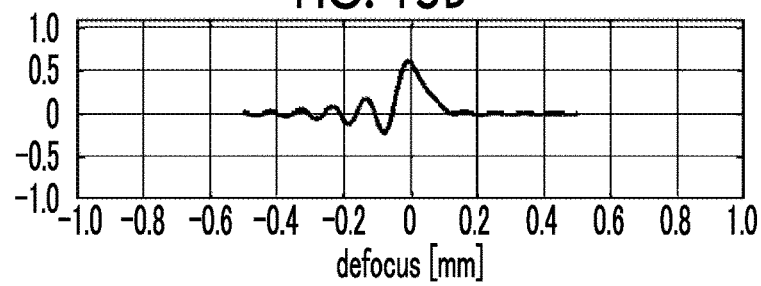

FIG. 15B shows the defocus OTF of the projection lens B2. The defocus OTF of the projection lens B2 has two or more local maximum values. However, the second largest local maximum value is less than 0.5 times the first largest local maximum value.

Figure 15C:
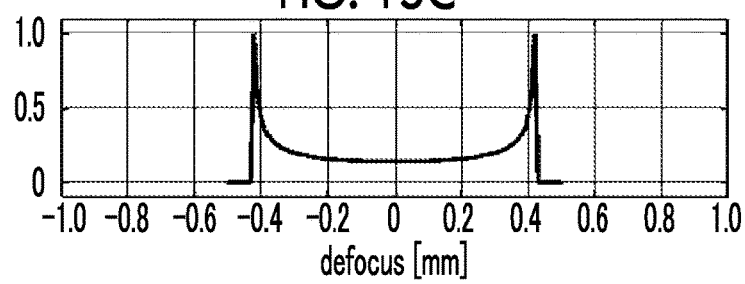
Figure 15D:
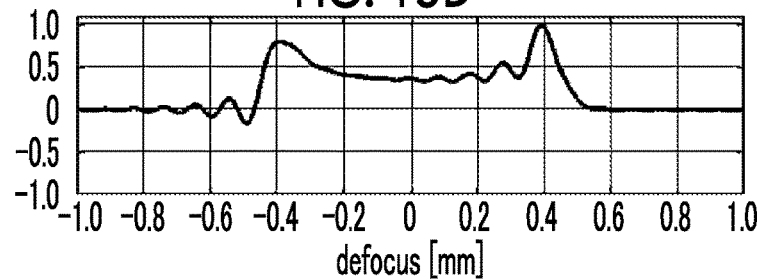
Figure 15E:
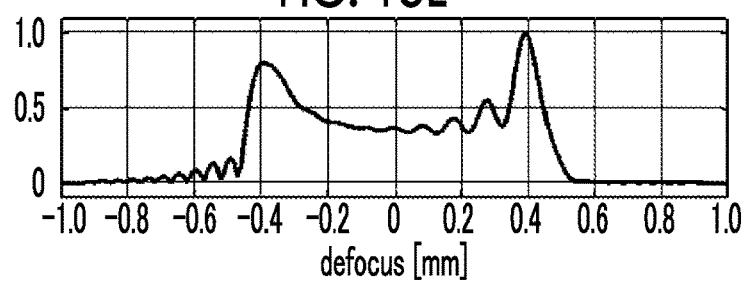

FIG. 15C shows the stay time in a case where the projection lens B2 is oscillated, and FIG. 15D shows the synthetic defocus OTF in a case where the projection lens B2 is oscillated during the stay time in FIG. 15C. The synthetic defocus OTF is calculated by convolution of the defocus OTF shown in FIG. 15B and the stay time shown in FIG. 15C. FIG. 15E shows the synthetic defocus MTF of the projection lens B2. The synthetic defocus MTF is rapidly improved around the defocus of 0.4 and −0.4. Therefore, even in a case where the projection image is projected on the basis of the above-mentioned synthetic defocus MTF, a projected image in which blurring is uniformly suppressed cannot be obtained.

<Example of Second Distance Measurement>

Next, a case where the amplitude of the oscillation of the projection lens 46 is automatically acquired in the projection method of the present invention will be described. In a case of automatically acquiring the amplitude of the oscillation, the projection apparatus 20 includes a distance measurement unit. For example, the distance measurement unit is composed of a camera having a distance measurement function. Further, it is preferable that the imaging lens of the camera is composed of the projection lens 46 or is configured to be coaxial with the projection lens 46.

Figure 16:
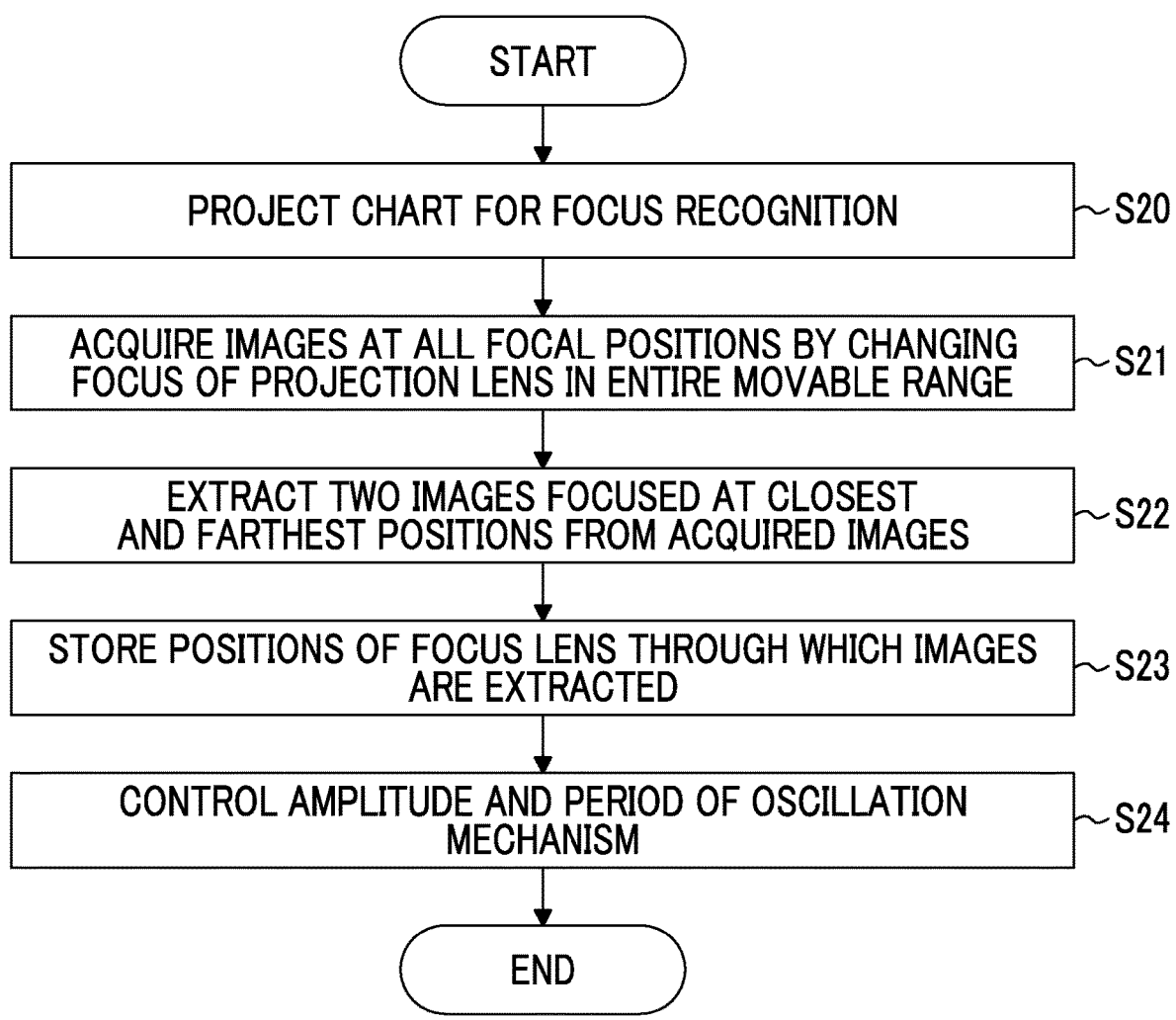
FIG. 16 is a diagram showing an operation flow of the projection apparatus.

FIG. 16 is a diagram showing an operation flow in the case where the distance to the projection target 10 is automatically acquired and projected using the projection apparatus 20.

First, the projection apparatus 20 projects a chart for focus recognition onto the projection target 10 (step S20). That is, the projection apparatus 20 causes the projection image generation unit 50 to generate a chart for focus recognition (for example, a black-and-white striped image), and projects the chart for focus recognition onto the projection target 10 through the display optical element 42. Thereafter, the focus lens 47 of the projection lens 46 is operated in the entire movable range (the focus lens 47 is scanned in the entire movable range), and images at all focal positions are captured and acquired (step S21). For example, in a case where the projection target 10 having projected and recessed portions is brought into focus at the projected and recessed portions, images are acquired. In a case where each image is acquired, the position of the focus lens 47 is stored in the acquired image.

Then, an image in a case where the distance between the projection lens 46 and the projection target 10 is the shortest and an image in a case where the distance between the projection lens 46 and the projection target 10 are the longest are extracted from the plurality of acquired images (step S22). Then, the positions of the focus lens 47 in the image in the case where the distance between the projection lens 46 and the projection target 10 is the shortest and the image in the case where the distance between the projection lens 46 and the projection target 10 is the longest are stored in the memory 40 (step S23). Thereafter, the control unit 41 controls the amplitude and the period of the oscillation mechanism 52 on the basis of the position of the focus lens 47 stored in the memory 40 (step S24). For example, the control unit determines the amplitude of the oscillation mechanism 52 on the basis of the distance between the projection lens 46 and the recessed portion of the projection target 10 and the distance between the projection lens 46 and the projected portion.

Although an example of the present invention has been described above, it is apparent that the present invention is not limited to the above-mentioned embodiments, and may be modified into various forms without departing from the scope of the present invention.

EXPLANATION OF REFERENCES

10: projection target
11, 12, 13: flat surface
20: projection apparatus
40: memory
41: control unit
42: display optical element
43: element driver
44: LED light source
45: light source driver
46: projection lens
47: focus lens
48: lens driver
50: projection image generation unit
51: data bus
52: oscillation mechanism
54: focus adjustment mechanism
101, 102, 103: projected image

What is claimed is:

1. A projection apparatus comprising:
   a light source;
   a projection image generation unit that modulates light of the light source and generates a projection image;
   a projection lens that projects the projection image generated by the projection image generation unit onto a projection target having projected and recessed portions, where a defocus optical transfer function at a specific frequency has two or more local maximum values and a second largest local maximum value is equal to or greater than 0.5 times a first largest local maximum value;
   an oscillation mechanism that oscillates the projection lens in a direction of an optical axis; and
   a control unit that controls an amplitude and a period of the oscillation mechanism,
   wherein the projection lens projects the projection image on the basis of a synthetic defocus modulation transfer function obtained by the defocus optical transfer function at the specific frequency of the projection lens and a time during which the projection lens stays at coordinates at the amplitude, and
   wherein a focal depth of the synthetic defocus modulation transfer function is adjusted to a depth of the projected and recessed portions of the projection target.

2. The projection apparatus according to claim 1, wherein a width of 0.35 or more of the synthetic defocus modulation transfer function is two or more times the amplitude.

3. The projection apparatus according to claim 1, wherein a width of 0.5 or more of the synthetic defocus modulation transfer function is two or more times the amplitude.

4. The projection apparatus according to claim 1, wherein a local minimum value between the first largest local maximum value and the second largest local maximum value has a value represented by the following expression,
   (Expression) local maximum value A×0.5 >local minimum value C >local maximum value A×(−0.5),
   where the first largest local maximum value is the local maximum value A, and the local minimum value between the first largest local maximum value and the second largest local maximum value is the local minimum value C.

5. The projection apparatus according to claim 2, wherein a local minimum value between the first largest local maximum value and the second largest local maximum value has a value represented by the following expression,
   (Expression) local maximum value A×0.5 >local minimum value C >local maximum value A×(−0.5),
   where the first largest local maximum value is the local maximum value A, and the local minimum value between the first largest local maximum value and the second largest local maximum value is the local minimum value C.

6. The projection apparatus according to claim 3, wherein a local minimum value between the first largest local maximum value and the second largest local maximum value has a value represented by the following expression,
   (Expression) local maximum value A×0.5 >local minimum value C >local maximum value A×(−0.5),
   where the first largest local maximum value is the local maximum value A, and the local minimum value between the first largest local maximum value and the second largest local maximum value is the local minimum value C.

7. The projection apparatus according to claim 1, wherein the specific frequency is in a range of ½ Nyquist frequency to ¼ Nyquist frequency.

8. The projection apparatus according to claim 2, wherein the specific frequency is in a range of ½ Nyquist frequency to ¼ Nyquist frequency.

9. The projection apparatus according to claim 3, wherein the specific frequency is in a range of ½ Nyquist frequency to ¼ Nyquist frequency.

10. The projection apparatus according to claim 4, wherein the specific frequency is in a range of ½ Nyquist frequency to ¼ Nyquist frequency.

11. The projection apparatus according to claim 5, wherein the specific frequency is in a range of ½ Nyquist frequency to ¼ Nyquist frequency.

12. The projection apparatus according to claim 1, wherein the control unit controls one period of 0.05 second to 0.1 second.

13. The projection apparatus according to claim 1, wherein in the projection lens, a size of a projected image of the projection image projected at a first focal position is equal to a size of a projected image of the projection image projected at a second focal position.

14. The projection apparatus according to claim 1, further comprising a distance measurement unit that measures a distance between the projection lens and the projection target,
   wherein the control unit controls the oscillation mechanism on the basis of the distance measured by the distance measurement unit.

15. The projection apparatus according to claim 14, wherein the control unit determines the amplitude of the oscillation mechanism on the basis of the distance measured by the distance measurement unit.

16. The projection apparatus according to claim 15,
   wherein the distance measurement unit measures a distance between the projection lens and the recessed portion of the projection target and a distance between the projection lens and the projected portion, and
   wherein the control unit determines the amplitude of the oscillation mechanism on the basis of the distance between the projection lens and the recessed portion of the projection target and the distance between the projection lens and the projected portion.

17. The projection apparatus according to claim 14, wherein the distance measurement unit includes a camera having a distance measurement function.

18. The projection apparatus according to claim 17, wherein an imaging lens of the camera having the distance measurement function is the projection lens or is coaxial with the projection lens.

19. A projection method of a projection apparatus including a light source, a projection image generation unit that modulates light of the light source and generates a projection image, a projection lens that projects the projection image generated by the projection image generation unit onto a projection target having projected and recessed portions, where a defocus optical transfer function at a specific frequency has two or more local maximum values and a second largest local maximum value is equal to or greater than 0.5 times a first largest local maximum value, and an oscillation mechanism that oscillates the projection lens in a direction of an optical axis, the projection method comprising
   a step of controlling an amplitude and a period of the oscillation mechanism, wherein the projection lens projects the projection image on the basis of a synthetic defocus modulation transfer function obtained by the defocus optical transfer function at the specific frequency of the projection lens and a time during which the projection lens stays at coordinates at the amplitude, and wherein a focal depth of the synthetic defocus modulation transfer function is adjusted to a depth of the projected and recessed portions of the projection target.

20. A projection apparatus comprising:

a light source;

a processor that modulates light of the light source and generates a projection image;

a projection lens that projects the projection image generated by the processor onto a projection target having projected and recessed portions, where a defocus optical transfer function at a specific frequency has two or more local maximum values and a second largest local maximum value is equal to or greater than 0.5 times a first largest local maximum value;

an oscillation mechanism that oscillates the projection lens in a direction of an optical axis; and a controller that controls an amplitude and a period of the oscillation mechanism, wherein the projection lens projects the projection image on the basis of a synthetic defocus modulation transfer function obtained by the defocus optical transfer function at the specific frequency of the projection lens and a time during which the projection lens stays at coordinates at the amplitude, and wherein a focal depth of the synthetic defocus modulation transfer function is adjusted to a depth of the projected and recessed portions of the projection target.

* * * * *